April 9, 1935.

G. C. ALSTAD ET AL 1,997,033

PASTEURIZING MACHINE

Filed April 2, 1932

Inventors:
John H. Baumgartner
George C. Alstad
By Harry C. Schute
Atty.

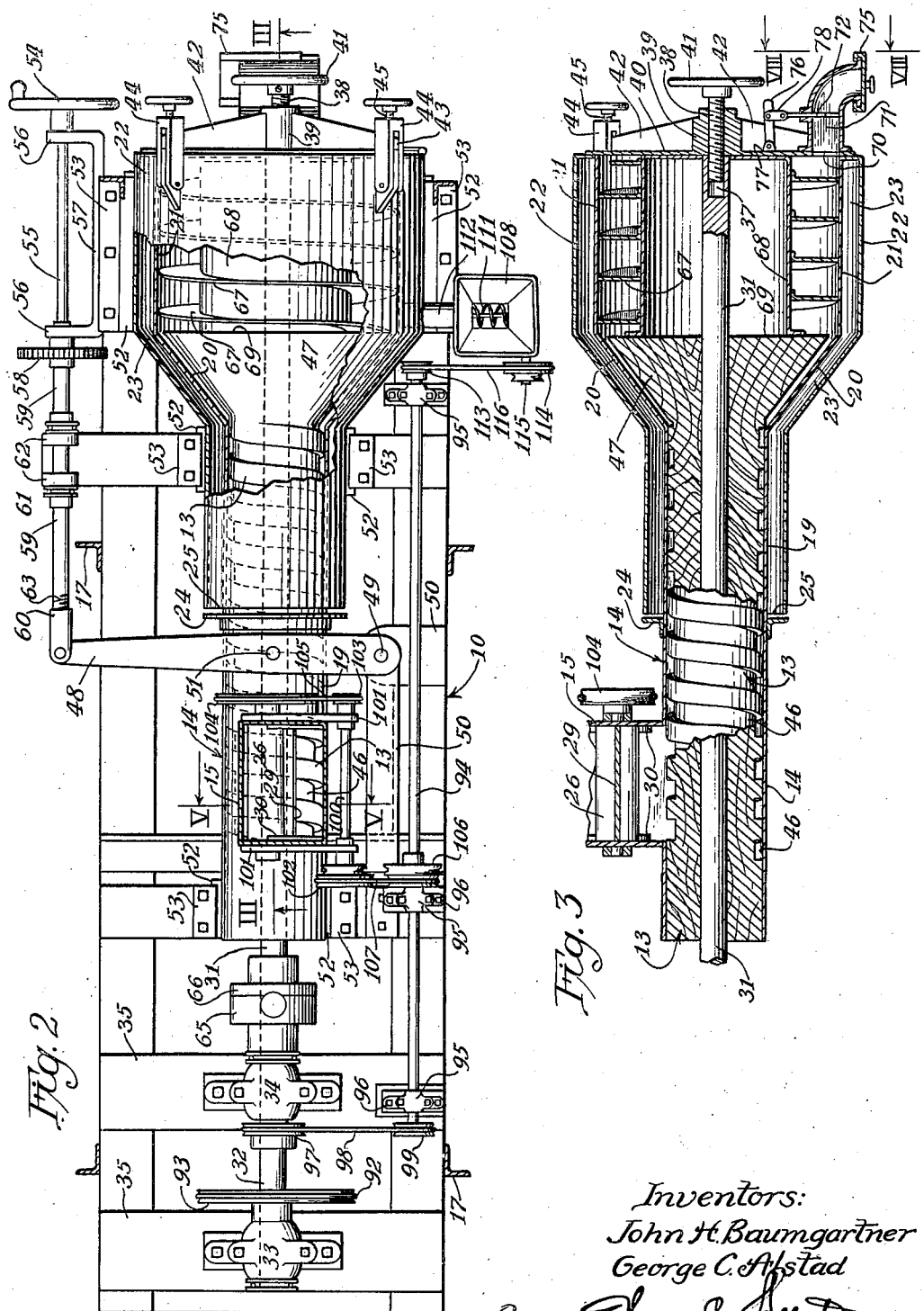

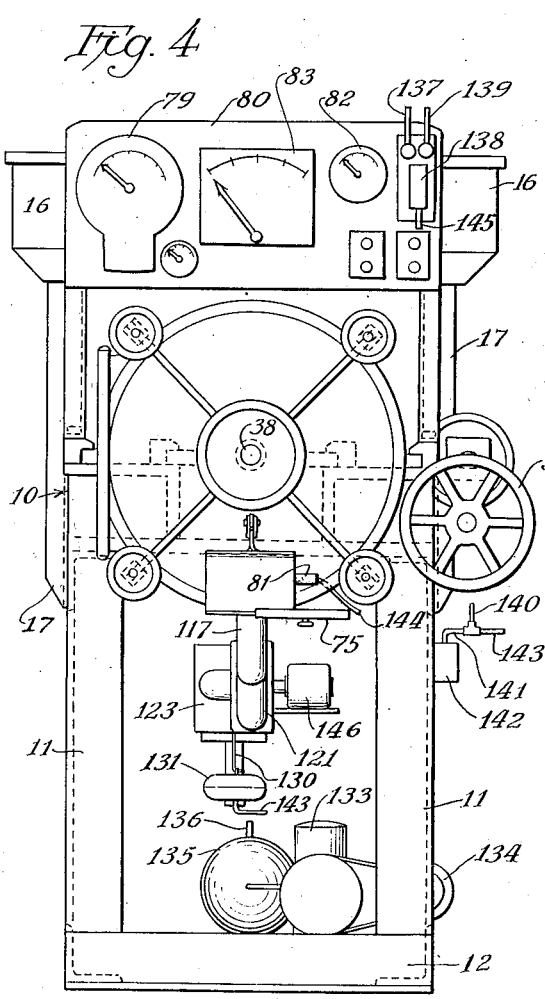

Patented Apr. 9, 1935

1,997,033

UNITED STATES PATENT OFFICE 1,997,033

PASTEURIZING MACHINE

George C. Alstad and John H. Baumgartner, Chicago, Ill., assignors to Doering Research & Development Corporation, Chicago, Ill., a corporation of Illinois Application April 2, 1932, Serial No. 602,748

12 Claims. (Cl. 99—2)

This invention relates to pasteurizing devices and more particularly to machines for imparting keeping qualities to edible substances such as cheese and similar dairy products, although it may be employed with equal advantage for other purposes.

It contemplates more especially the provision of means for mechanically emulsifying and/or pasteurizing dairy plastics without resort to extraneous heat, thereby insuring against disintegration or casein separation to the end of accomplishing complete homogeneity incident to imparting keeping qualities thereto.

Dairy products such as cheese, butter and kindred edible plastics are customary emulsified and pasteurized by intermixing chemicals therewith and effecting the subjection thereof to elevated temperatures prior to packaging. Pasteurization tends to preclude or at least retard deterioration occasioned by bacteria infestation responsive to natural bacteria decay over an extended period of time, but the intermixture of emulsifying chemicals therewith constitutes undesirable adulterants. Fundamentally, the difficulty of pasteurizing cheese or other dairy products with heat is the inability to prevent disintegration of the constituents or the separation of the butter fat from the casein, thereby destroying the homogeneity thereof. It has long been the practice, therefore, of employing mechanical agitators and stirring implements during heat pasteurization to prevent disintegration, but such expedients require skilled supervision and constant regulation not always productive of uniformity. Then, too, the incorporation of chemicals is quite essential with customary processes of pasteurization to procure homogeneity, but this is accomplished at the expense of adulteration.

As a consequence the known devices for effecting pasteurization which require the subjection of the dairy products to heat supplied from some extraneous source, have not acquired perfection from both the standpoint of production costs and uniformity in the resulting product. The present invention departs entirely from known processes in that heat of pasteurization is produced incident to the processing of dairy products to insure complete homogeneity and increased smoothness of texture responsive to the emulsification thereof without resort to adulterants such as chemicals. Moreover, edible dairy plastics are kept intact and improved in texture by the adhesive character of the adjacent particles so that thorough emulsification especially when accomplished without resort to adulterants, is productive of a decidedly superior product.

Dairy products are especially appetizing when possessing a fine velvety consistency in that such possess a decidedly improved taste owing to the complete emulsified condition thereof which results from processing in accordance with the teachings of the present invention. The keeping qualities and texture thereof are enhanced even more by resort to primarily mechanical rather than thermal processing to impart an accentuated velvety homogenous consistency and keeping qualities to the natural plastic product. Improved texture and body with enhanced taste characteristics and blending possibilities have been required by re-emulsifying the substances subsequent to the subjection thereof to sterilizing temperatures. Thus, a completely emulsified product is produced without the slightest adulteration nor processing impairment in that such is effected in continuous sequence with the steps of initial emulsifying and pasteurizing treatment.

One object of the present invention is the provision of means for emulsifying and pasteurizing dairy products and effecting the re-emulsification thereof to insure complete homogeneity and an improved product.

Another object is to provide means for continuously effecting the emulsification, pasteurization and re-emulsification of dairy products without resort to extraneous heat.

Still another object is the provision of means for improving dairy products by thorough mechanical rather than chemical emulsification thereof.

A further object is the provision of means for more satisfactorily emulsifying and pasteurizing edible plastics by the subjection thereof to a mechanical pressure and friction reaction.

A still further object is to provide novel mechanical means for processing edible plastics to improve the texture and taste qualities thereof.

Still a further object is the provision of a novel combination of elements for mechanically rather than thermally processing edible substances resulting in a superior product having extended keeping qualities, improved taste, better texture and increased emulsified uniformity of the constituents.

An additional object is to provide means for producing frictional heat of sterilization incident to processing cheese to a complete homogeneous edible substance possessing keeping qualities with more complete emulsified constituents.

Other objects and advantages will appear from the following description of an illustrated embodiment of the present invention.

In the drawings:

Figure 2 is a plan view of the device shown in Figure 1 taken substantially along line II—II thereof, there being parts broken away to clarify the showing.

Figure 3 is a sectional view taken substantially along line III—III of Figure 2.

Figure 4 is a front view of the machine shown in Figure 1.

Figure 5 is a sectional view of the feeding device taken substantially along line V—V of Figure 2.

Figure 6 is a sectional view taken substantially along line VI—VI of Figure 5.

Figure 7 is a sectional view taken substantially along line VII—VII of Figure 6.

Figure 8 is an enlarged view of the discharge spout taken substantially along line VIII—VIII of Figure 3, parts thereof being broken away to clarify the showing.

Figure 9 is a fragmentary side view of the discharge spout shown in Figure 8.

Figure 1:
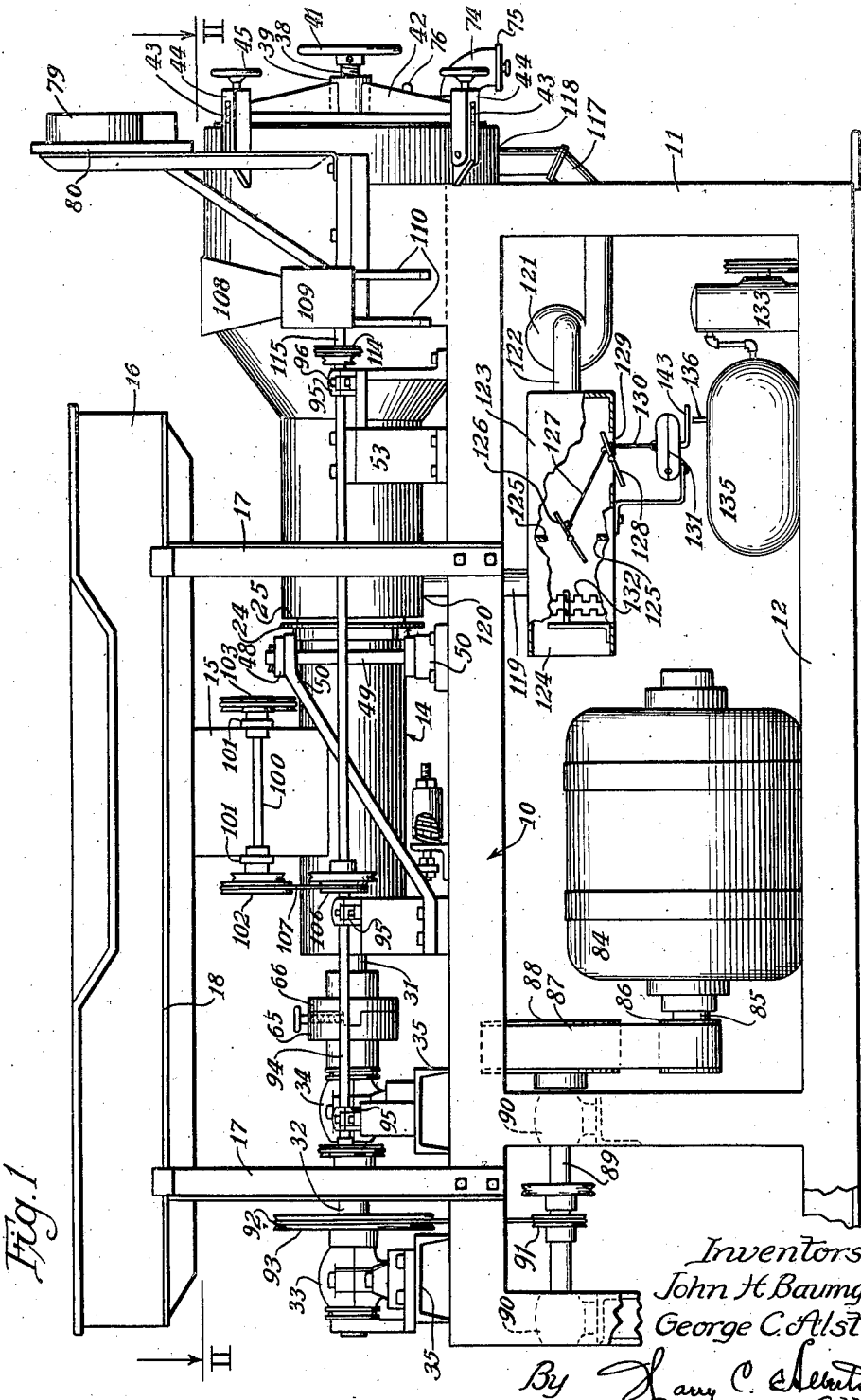
Figure 1 is a side view in elevation of a device embodying features of the present invention.

The structure selected for illustration comprises a substantially rectangular frame 10 of any suitable construction which is elevated from the floor or other foundation by means of corner standards 11 riveted or otherwise joined thereto in the customary manner as commercial practice may dictate. Cross members 12 extend between the standards 11 near the base thereof to reinforce the frame structure 10 in providing a rigid and non-vibrating support for instrumentalities to be hereinafter described. In order to feed edible substances along a predetermined path, a spiral screw conveyor 13 is, in this instance, journalled for rotary support in a housing 14 which is constructed to conform substantially in configuration therewith.

As shown, the pasteurizing housing 14 has a feeding conduit 15 which extends in a vertically upward direction for communication with the interior thereof to direct the substance from any suitable source of supply to the conveyor 13. In order to enable the cheese or other substance to be supplied to the feeding conduit 15, a substantially rectangular receptacle 16 is mounted thereabove by means of standards 17 which depend to the frame 10 to effect the rigid horizontal support thereof. A suitable opening corresponding in dimensional extent and contour to the interior of the feeding conduit 15 is provided in the bottom 18 of the receptacle 16 for communication therewith so that a large volume of the cheese or other substance to be processed may conveniently and readily be supplied to the pasteurizing housing 14 for traverse and feeding along a predetermined path in a manner that will appear more clearly hereinafter.

The pasteurizing housing 14 has, in this instance, a cylindrical entrant portion 19 which extends longitudinally of the frame 10 for a termination in a frusto-conical body 20 having a cylindrical end portion 21 serving as an auxiliary cheese treatment chamber for re-emulsification or other purposes as commercial practice may dictate or shall appear more fully hereinafter. Obviously, it is necessary or at least highly desirable to remove the initial chill from the material comprising the body of the pasteurizing housing 14 and auxiliary parts thereof so that the developed heat of pasteurization may be produced instantaneously responsive to the passage of the cheese therethrough. To this end, it has been found feasible and effective to provide an external casing 22 which concentrically envelopes a part of the cylindrical housing portion 19, 20 and the end portion 21 of the pasteurizing housing 14, it being substantially larger and of corresponding configuration to define an air chamber 23 therewith. The air chamber 23 is closed at the forward end thereof and a peripheral flange 24 slidably embraces the pasteurizing housing portion 19 for adjustable application to the housing edge 25, thereby serving as an adjustable closure or valve for the air chamber 23. Air is circulated through the chamber 23 for a purpose and controlled in a manner as will appear more fully hereinafter.

The feeding conduit 15 has, in this instance, a power actuated substance feeder mechanism comprising a cylindrical shaft 26 which has reduced axial extensions 27 and 28 for journalled support in horizontally aligned apertures in confronting walls of the feeding conduit 15. As shown, the shaft 26 is positioned more proximate to one side of the conduit wall 15 than the other, it being substantially adjacent to the more proximate wall to serve as an eccentric rotary member. To this end a substantially rectangular blade 29 is slidably projected diametrically through the shaft 26 to correspond in dimensional area with the interior cross-section of the substance feeding conduit 15; consequently the rotation thereof will effect the traverse of the cheese or other substance displaced thereon from the receptacle 16. The path of the blade 29 is governed by confronting ledges 30 preferably of predetermined cycloidal configuration, these projecting from opposed walls of the conduit 15 and the blade 29 contacts therewith so that with the rotation of the shaft 26, the blade 29 will rotate therewith and simultaneously reciprocate diametrically therethrough. The blade 29 thus serves to feed the substance along a predetermined path for processing in a manner to be hereinafter described.

The edible plastics or substances taken directly from the churn or storage where aging is permitted to impart a predetermined strength thereto or in the instance of butter to effect preserved freshness under reduced temperatures, are then directed to the hopper or entrant orifice of the conduit 15 from the receptacle 16. The substance is then subjected to a physical pressure reaction which elevates the temperature for mechanical emulsification and/or pasteurization. In the present embodiment heat of pasteurization is developed mechanically incident to the passage of the substance through a constriction or between surfaces in frictional reaction to effect pasteurization during the movement thereof along a predetermined path. This is accomplished by passing successive increments of the substance in comminuted or plastic condition through a constriction of any type where heat will be evolved as a consequence thereof.

In order to effect the traverse of the substances through a constriction for creating heat of pasteurization incident to the traverse thereof, the cylindrical portion 19 of the housing 14 is provided with a conveyor, in this instance the screw conveyor 13, which is mounted upon a shaft 31 having a segregated portion 32 thereof journalled in spaced split bearings 33 and 34 sustained upon cross plates 35 which are secured to the top of the frame 10 in any suitable manner. The forward extremity of the shaft 31 has, in this instance, an axial bore 37 journalled on an aligned inwardly projecting stud shaft 38 which threadedly engages a central boss 39 constituting an integral portion of an end closure 40 for the open extremity 22 of the pasteurizing housing 20. It is to be noted that a wheel 41 is carried by the stud shaft 38 to enable the shaft 31 to be engaged and disengaged responsive to the manipulation thereof which is responsible for the registry or removal of the stud shaft 38 with the axial shaft bore 37.

The closure 40 is provided with radially extending ribs 42 formed integral therewith for projection beyond the periphery thereof to define extensions 43 complemental to bifurcated clamp members 44 which are pivotally connected for extension from the lateral face of the pasteurizing housing rim 21, thereby enabling the association and disassociation of the closure 40 responsive to the adjustment of threaded stud members 45 which engage the clamps 44. In order to maintain the closure 40 in its operating position against displacement, the studs 45 are threaded for engagement with the clamps 44 to bear against the extensions 43, thereby securing the closure 40 against removal. It is significant to note that the conveyor 13 has a spiral groove 46 formed therein to feed the substance therealong responsive to the rotation thereof, and it has been found advantageous to pre-condition the cheese by the subjection thereof to a densifying action during the initial traverse thereof by gradually diminishing the depth of the feeding groove 46. This tends to densify the dairy plastic or effects the gradual crowding thereof and effecting pressure deformation to the end of producing heat in consequence thereof, this preheating being desirable as it speeds up production and results in greater uniformity of the final product.

As shown, the cylindrical conveyor 13 merges into a conical rotor 47 splined or otherwise fixed to the shaft 31 for rotation therewith in proximity to the correspondingly shaped portion 20 of the pasteurizing housing 14, thereby defining a minute constriction therebetween for the passage of the edible substance from the conveyor 13 which has the helical convolutions in the form of a continuous spiral groove 46 in communication therewith to enable or institute the travel of the substance between the confronting surfaces 47 and 20 which are in pressure reaction through the medium of the substance confined therebetween. The extent of the constriction defined between the surfaces 47 and 20 may be modified to conform with the desired emulsifying treatment or required heat of pasteurization through the medium of a lever 48 which is pivoted to a vertical rod 49 supported by brackets 50 fixed to the frame 10 in any appropriate manner. The lever 48 has a pin 51 extending therethrough for attachment to the cylindric portion 19 of the housing 14, thereby effecting the reciprocable movement thereof axially along the screw conveyor 13. To this end, the housing 14 is provided with diametrically attached and horizontally aligned edges 52 positioned both forwardly and rearwardly and these cooperate with correspondingly shaped brackets 53 serving as complements therefor to enable the slidable adjustment of the housing 14 relative to the rotor surface 57 with its conveyor 13.

The lever 48 is rendered responsive to a rotary hand manipulated wheel 54 which is attached to a stub shaft 55 journalled in the confronting arms 56 of a frame attached bar 57. A spur gear 58 meshes with a pinion on the shaft 55 in the customary manner, and the former is supported by a shaft 59 having a tubular link 60 in threaded engagement with the extremity thereof, the link being pivotally connected to the free extremity of the lever 48. End thrust bearings 61 are spaced on the shaft 59 to receive bearing brackets 62 therebetween so as to avoid unnecessary friction as a result of and thrust reaction thereon. The shaft 59 rotates relative to the pivoted link 60, thereby creating comparatively small displacement of the housing 14 responsive to threaded reaction of the shaft threads 63 with the correspondingly threaded link 60.

Rotation of the shaft 32 which imparts corresponding rotation to the shaft 31 owing to the complemental clutch elements 65 and 66 extending therebetween, will effect the traverse of the comminuted substance along the spiral conveyor to gradually build up and densify therealong owing to the progressive lessening depth in the conveyor convolutions 46 until reaching the entrant periphery of the rotor 47 for further displacement substantially increased compression and pressure deformation about the conically arcuate surface thereof to cooperate with the correspondingly shaped surface 20 of the casing body or housing 14. As shown, the conical rotor portion 47 terminates in a mixing and re-emulsifying chamber defined by the cylindric housing portion 21, and this confines a continuous spiral consisting, in this instance, of a comparatively deep convolute 67 which precludes separation of the substance components and in fact serves to better and more uniformly combine them into a more uniform and satisfactory product. In consequence thereof, continued rotation of the conical rotor portion 47 in unison with the conveyor 13 will effect the travel of the plastic substances through the constriction defined between the reacting surfaces 47 and interior 20 of the housing 14 which are in frictional reaction through the medium of the substance therebetween for developing heat of pasteurization or at least substance emulsification responsive to the rotation of the former with respect to the latter.

The substances are thus subjected to a pressure reaction which in conjunction with the frictional contact of the relatively moving surfaces therewith, elevates the temperature of the moving substances to a point of pasteurization of, if desired, merely sufficient to aid in mechanical emulsification. The degree of temperature elevation and the maintenance thereof at a predetermined magnitude may be controlled by the distance of the surface 47 with respect to the interior surface 20 of the housing 14 responsive to adjusting or manipulating the manually operated wheel 54 as conditions may require or deem advisable. During this passage of the plastic particles, heat of pasteurization is developed incidental to the rotation of the rotor surface 47 which also serves to effect movement thereof to its periphery for discharge into the agitating and re-emulsifying chamber 21 to impart improved texture, uniformity and consistency thereto. It is thus apparent that the use of extraneous heat such as steam or any other vapor or liquid thermal medium is entirely avoided, and the processing effected in a manner which imparts complete homogeneity to the resulting product without any possible disintegration or separation of the elements or their composition.

Discharge of the substances from the constriction and thence the re-emulsifying chamber 21 is effected primarily by the centrifugal urge imparted thereto and effective thereon at the periphery responsive to the rotation thereof; however, any accummulation owing to the adhering character thereof, is removed by the spiral in the form of convolute 67 fixed to the drum 68. The drum 68 is axially attached to the forward wall 69 of the rotor 47 for rotary movement therewith, thereby expelling the emulsified and/or pasteurized substance through a discharge orifice 70 formed by a spout 71 which integrally extends from the closure 40 for communication with the interior of the chamber 21, a suitable gate comprising, in this instance, a slidable closure 72 is adjustably disposed in suitable guides 73 for passage through the discharge spout 71 to govern the flow of the substance therethrough for placement in any suitable container from a spout extension 74 which has another separately controlled slide valve 75 flanged for connection to the extremity thereof.

A lever 76 is pivoted to the housing closure 40 as at 77, and a link 78 is interposed between the lever 76 and gate valve 72 so as to afford the more convenient control and adjustment thereof. Then, too, the slide valve 75 is independently adjustable and the diminution or increase of substance passage has a substantial effect upon the temperature existent in the housing portion 47 and agitating or emulsifying chamber 21. So that the temperature of the discharging substance may be known and controlled, a thermometer 79 is suitably mounted or attached to an instrument board 80, it being in operative thermal connection to the chamber 23 of the air housing 22 to designate the temperature thereof. Similarly, a thermometer lead 81 is attached to the discharge spout 71 for communication with the interior 70 thereof so that the temperature of the issuing or pasteurized products may be known and controlled to produce the best and most effective result from the standpoint of homogeneity, emulsification and/or the keeping quality of the resulting product. The thermometer lead 81 is connected to an indicator or thermometer 82 fixed to the instrument board 80 for convenient view and examination by the attendants. Then, too, the indicator 83 is mounted thereon to register the relative position of the housing 14 with respect to the rotor or conveyor 13, thereby enabling the instant selected adjustment of the various instrumentalities for temperature maintenance within the required range for procuring the best results.

The various instrumentalities necessary for effecting the emulsification, pasteurization and processing without resort to extraneous heat are operated from a single source of power, in this instance an electric motor 84 supported beneath the frame 10 for attachment thereto in any appropriate manner to prevent displacement. The armature shaft 85 of the motor 84, carries a pinion 86 which meshes with a silent chain 87 to connect a sprocket 88 fixed for rotation in unison with a stub shaft 89 journalled in bearings 90 and carried by the frame 10. A sprocket wheel 91 is fixed to the shaft 89 between the bearings 90 thereof to drive a chain 92 which meshes with a sprocket wheel 93 fixed to the shaft 32 to effect the rotation thereof in a counter-clockwise direction (viewed from Figure 4). In consequence thereof, corresponding movement or rotation is imparted to the conveyor 13 and the rotor surface 47 which are fixed to the shaft 31 in operative connection with the shaft 32 by virtue of the clutch 65–66 disposed therebetween. In order to simultaneously rotate the feeder 29 with its shaft 26 in timed relation with the conveyor 13, a shaft 94 is journalled in bearings 95 (Figure 2) fixed to the frame 10 by means of fasteners 96, the shaft 94 extending for a greater portion of the frame 10 to operate various instrumentalities as will appear more fully hereinafter. A sprocket wheel 97 is fixed to the shaft 32 to establish an operative connection therewith owing to an intervening chain 98.

As shown, the shaft 94 terminates in a sprocket 99 which meshes with the chain 98 to impart rotation of the shaft 32, occasioned by the energization of the electric motor 84. A stub shaft 100 is journalled in brackets 101 fixed to the feeder conduit 15, and sprocket wheels 102 and 103 are fixed to the extremities thereof. The sprocket 103 is in alignment with a sprocket 104 mounted on the extremity of the feeder blade shaft 26. A chain 105 is interposed therebetween to mesh with the sprockets 103 and 104, the sprocket 102 being operatively connected to a sprocket 106 carried by the shaft 94 through the medium of a chain 107. It will thus be apparent that the instrumentalities thus far described are motivated from a single source of energy or power, in this instance the electric motor 84. It is well known to incorporate chemical preservaties and/or flavors such as pimento in dairy or other edible substances prior or during their pasteurization. To this end, a chemical and/or flavor receiving hopper 108 of standard construction and design is mounted upon a casing 109 which is supported by inclined brackets 110 adjacent to the mixing chamber 21 and above the frame 10. So that the various propelling, mixing and even comminuting elements or devices 111 thereof may discharge the desired elements along a conduit or pipe 112 in communication with the interior of the re-emulsifying chamber 21, discharges of the resulting product to the entrant orifice thereof and to control and regulate the volume of substance incorporated in the cheese or other processed substances to acquire the desired uniformity in the resulting product, the propelling, and mixing instrumentalities 111 journalled in the hopper casing 109 is rendered operative responsive to the rotation of the conveyor 13.

In consequence thereof, a sprocket wheel 113 is mounted on the shaft extremity 94 in alignment with a sprocket 114 fixed to a stub shaft 115 operatively geared to the conveying instrumentalities 111 journalled in the casing 109. A chain 116 extends between the sprockets 113 and 114 in meshing engagement therewith so as to rotate the shaft 115 and impart rotation to the shaft carrying the propelling or feeding instrumentality 111 in the casing 109. As a result, the chemical or other ingredient feeding device 111 is operated responsive to the motor 84 which controls the movement of the other instrumentalities described, supra, in connection with the emulsifying, pasteurizing and re-emulsifying of the substances, this constituting one of the primary features of the instant invention. The relative speed of rotation of the conveyor shaft 31, the feeder shaft 26 and the pimento feeder instrumentality 111 is controlled and capable of variation by virtue of the relative sizes of sprockets 93, 102, 104, 106, and 114 which may be independently changed and substituted to effect the proper relative speeds that are productive of the best results.

As stated supra, a suitable cooling medium such as air is circulated through the chamber 23 defined by the exterior casing 22. To this end, a pipe line 117 establishes communication therewith along the forward lower region thereof as at 118, and a discharge passage 119 extends from the rearward lower region for communication therewith as at 120 to establish a circuitous path for the cooling medium. The pipe line 117 terminates in a blower 121 which has a pipe 122 in communication with the entrant orifice thereof. The pipe 122 connects with an air control chamber 123 which is closed on all sides except the end region 124. The discharge pipe 119 terminates in the air control casing 123 just forwardly of the open end 124 thereof so as a support is established between the entrant and discharge pipes 117 and 119 through the casing 123. A partition 125 is disposed intermediate the ends of the casing 123 to cooperate with a pivotal valve 126 mounted therein. The valve 126 is rendered responsive to a length 127 which connects another valve 128 pivoted along the bottom of the chamber 123 to open or close an orifice 129 provided therein. It will thus be apparent that the pivotal valves 126 and 128 are of similar size and construction, and these operate in corresponding timed relation so as to open the partition 125 when the orifice 129 closes and vice versa. A rod 130 connects the valve 128 with an air responsive diaphragm 131 so as to manipulate and regulate the valves or dampers at 126 and 128 responsive to predetermined air pressures. An electric heater 132 is positioned approximate to the open end 124 of the air control chamber 123 so that the entrance or air therethrough responsive to the operation of the blower 121 will simultaneously energize the electric heating element 132 to warm the air that may pass therethrough for charging the chamber 23 around the cheese housing 14 through the conduit 117.

An air compressor 33 is mounted on the base of the frame 10 for operation responsive to an electric motor 134. An air tank or reservoir 135 is in communication with the air compressor 133 to supply air through a tube 136 (Figures 1 and 4) leading to a tube 137 (Figure 4) in communication with a thermo-couple 138 or other temperature responsive devices mounted on the instrument board 80. Another tube 139 is in communication with the temperature responsive device 138 and this leads to a tube 140 (Figure 4) which communicates with an air tube 141 and electric switch control 142 mounted on the frame 10. The tube 141 also has a branch 143 thereof connected to a pressure responsive diaphragm 131 (Figure 1) through the lead 134. The thermometer 81 (Figure 4), in turn, as has the lead 142 thereof connected to the lead 143 which actuates a valve in the indicator 138 to control the passage of air between the tube 137 and 139.

The air compressor 134 is rendered automatically responsive to the air pressure in the reservoir 134 so that there will be a constant supply of air for the regulating and automatic control system. The indicator 138 may be regulated to render the electric switch 142 responsive thereto so as to control the operation of a motor 146 connected to the blower 121, thereby rendering the operation thereof automatic to control the flow of air through the chamber 23 in effecting very sensitive regulation of the temperature to which the cheese or other substance is subjected. In consequence, the flow of air through the chamber 23 defined by the housing 14 and the exterior casing 22, is regulated automatically to issue either cold or hot air therethrough depending on whether such is introduced through the orifice 129 or the open end 124 of the control casting 123.

Various changes may be made in the embodiment of the invention herein specifically described without departing from or sacrificing any of the advantages thereof as defined in the appended claims.

We claim:

1. In a device of the character described, the combination with means for feeding edible substances along a predetermined path, of means in said path for producing frictional heat of pasteurization, mechanical emulsifying means in said path to receive the substance from said pasteurizing means, and means for directing the discharge of the edible substances from said emulsifying means.

2. In a device of the character described, the combination with means for feeding edible substances along a predetermined path, of confronting surfaces disposed in said path to receive the feeding edible substances therebetween, said feeding means having convolutions of varying depths densifying the edible substances responsive to the feeding thereof, and means for imparting relative movement to said surfaces for effecting pasteurization incident to the passage of the substances therebetween.

3. In a device of the character described, the combination with means for feeding edible substances along a predetermined path, of friction heat producing means in said path for effecting the pasteurization of the substances incident to its passage therethrough, means for relatively displacing said heat producing means to vary the pasteurization effect, and means for withdrawing the substances from said pasteurizing means and serving to impart increased agitation for re-emulsifying purposes.

4. In a device of the character described, the combination with means for feeding edible substances along a predetermined path, of relatively movable surfaces defining a constriction in said path, and means for imparting movement to said surfaces for extruding the substances through said constriction incident to producing frictional heat of pasteurization, and a convolute extending axially of said constriction to agitate the pasteurized substances.

5. In a device of the character described, the combination with rotary means for feeding edible substances along a predetermined path, of relatively movable surfaces defining a conical constriction in said path, and means for imparting relative rotary movement to said surfaces for centrifugally extruding the substances through said constriction incident to producing frictional heat of pasteurization, and agitating means in said path for rotation with said feeding means for imparting further agitation to the pasteurized substances.

6. In a device of the character described, the combination with a spiral conveyor having convolutes of varying depth for feeding substances along a predetermined path, friction means defining a constriction developing heat of pasteurization and effecting substance passage therethrough arranged for relative rotation responsive to said conveyor, and a convolute constituting an axial extension of said conveyor and pasteurizing means for rotation therewith to effect the further emulsification and discharge of the pasteurized substances.

7. In a device of the character described, the combination with a conveyor having convolutions of lessening depth for feeding substances along a predetermined path, complemental conically shaped members in frictional contact with the substances, means for imparting relative rotation to said members to develop heat of pasteurization, and a spiral agitator axially mounted for rotation with said conveyor to agitate the pasteurized substances for further emulsification and discharge.

8. In a device of the character described, the combination with a conveyor for feeding substances along a predetermined path, of complemental conically shaped members in frictional contact with the substances, means for imparting relative rotation to said members to develop heat of pasteurization, and a spiral extension conveyor axially mounted for rotation with one of said members to further emulsify the pasteurized substances and effect the continued feeding thereof for discharge, and means for guiding the discharge of the substances from said extension conveyor.

9. In a device of the character described, the combination with a conveyor having convolutions of lessening depth for densifying, pre-heating and feeding substances along a predetermined path, of complemental conically shaped members in frictional contact with the substances, means for imparting relative rotation to said members to develop heat of pasteurization, a spiral agitator axially attached to said rotor for extension therefrom in the path of said constriction to withdraw the substances therefrom and effect the further emulsifying of the pasteurized substances, and an end closure for said constriction, there being a discharge orifice in said end closure disposed in the path of said agitator emulsifying means.

10. In a device of the character described, the combination with a casing, of means having convolutions of varying depth for feeding edible substances along a predetermined path, relatively movable surfaces defining a constriction in said path, means for imparting relative movement to said surfaces for extruding the substances through said constriction incident to producing frictional heat of pasteurization, a closure associated with the discharge end of said closure for communication with said constriction, a discharge spout formed in said closure for communication with the interior of said casing, and spiral means movable with one of said surfaces to direct the pasteurized substances from said constriction to said spout for discharge.

11. In a device of the character described, the combination with a casing, of means for feeding edible substances along a predetermined path, relatively movable surfaces defining a constriction in said path, means for imparting relative movement to said surfaces for extruding the substances through said constriction incident to producing frictional heat of pasteurization, a closure associated with the discharge end of said closure for communication with said constriction, a discharge spout formed in said closure for communication with the interior of said casing, agitator means movable with one of said surfaces to direct the pasteurized substances from said constriction and effect the further emulsification thereof, a casing surrounding said first named casing to define a chamber therebetween, and means for directing cooling medium through said chamber.

12. In a device of the character described, the combination with a casing, of means for feeding edible substances along a predetermined path, relatively movable surfaces defining a constriction in said path, means for imparting relative movement to said surfaces for extruding the substances through said constriction incident to producing frictional heat of pasteurization, a closure associated with the discharge end of said closure for communication with said constriction, a discharge spout formed in said closure for communication with the interior of said casing, agitator means movable with one of said surfaces to direct the pasteurized substances from said constriction and effect the further emulsification thereof, a casing surrounding said first named casing to define a chamber therebetween, and means for automatically directing a heating or cooling medium through said chamber to maintain the heat of pasteurization within a predetermined range.

GEORGE C. ALSTAD.
JOHN H. BAUMGARTNER.